M. S. ROBERTS.
Peat Machine.
No. 49,438. Patented Aug. 15, 1865.
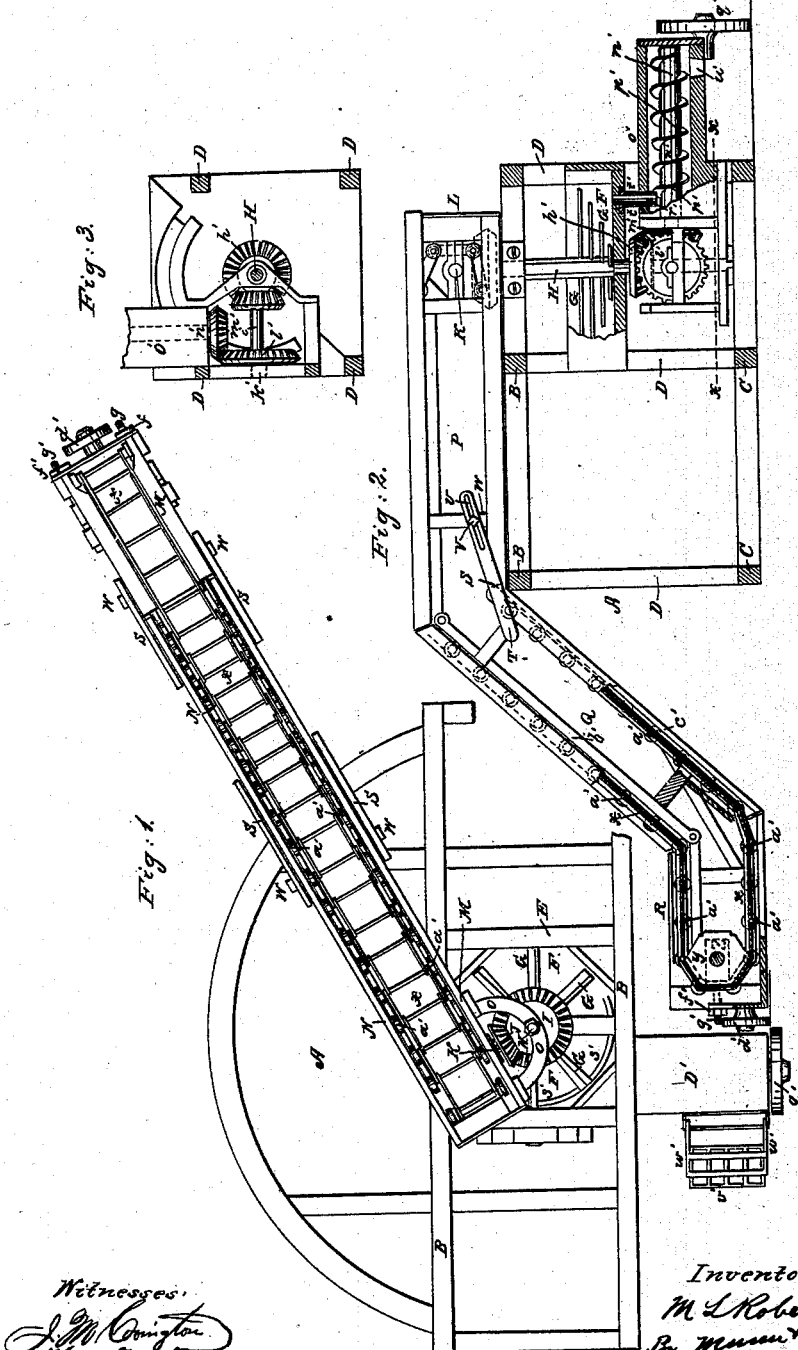

UNITED STATES PATENT OFFICE.

MARVIN S. ROBERTS, OF LEWISTON, NEW YORK.

IMPROVED APPARATUS FOR PREPARING PEAT.

Specification forming part of Letters Patent No. 49,438, dated August 15, 1865.

*To all whom it may concern:*

Be it known that I, MARVIN S. ROBERTS, of Lewiston, in the county of Niagara and State of New York, have invented a new and useful Machine for Making Peat; and I do hereby declare that the following is a full, clear, and exact description thereof, which will enable others skilled in the art to make and use the same, reference being had to the accompanying drawings, forming part of this specification.

In the manufacture or preparation of peat to be used as fuel for heating purposes it has heretofore been usual to first convey the peat, by carting, from the place where it is gathered to the machine used for cutting or mashing up the same, and after having been thus thoroughly operated upon it is next removed therefrom and spread out upon the ground in any suitable locality, when it is marked or divided off into sections, and having remained a sufficient length of time to be thoroughly dried and relieved of its moisture is then separated into cakes or pieces, according to its division-marks, and ready for the market or use. But in the practice of the above mode of preparing peat for fuel it is manifest that considerable delay, time, and expense are necessarily incurred in the carting or conveying the peat as fast as gathered to the mill, and then removing the same therefrom and spreading it out to be dried, and to remedy these is the principal object of the present invention, and is accomplished thereby, my improvements consisting—

First. In connecting with the peat grinding or cutting mill or machine an endless band placed within a suitable frame, which band extends from the machine to the locality where the peat is being gathered, and, together with its frame, is so arranged as to be easily adjusted or extended to any desired length or distance, according as may be necessary, or as the peat locality may be near to or far from the machine. On this endless band the peat, as fast as gathered, is thrown, and then conveyed thereby to the machine, said band being operated in the proper direction by means of any suitably-arranged devices connecting it with the driving power of the mill.

Second. In also connecting with the mill, and so arranging in connection therewith and with its driving power as to freely and readily adjust itself to all inequalities in the surface of the ground, and thus prevent any strain upon the gearing of the mill, a box or receptacle for distributing the peat as fast as prepared in the machine, and spreading it on the ground, said distributing-box being so arranged and moved around in a circle as to most completely and perfectly spread the peat for the purpose of being dried, after which it is removed in the ordinary manner.

Third. In the attachment to the distributing or spreading box for the peat of a proper-shaped marking or dividing tool or device, arranged and hung upon the same in position to be easily and readily brought to bear upon the peat at the proper times.

I have also made various improvements other than those above referred to in the detail construction and arrangement of my machine, which will be hereinafter particularly specified.

In accompanying plate of drawings my improvements are illustrated, Figure 1 being a plan or top view; Fig. 2, a vertical sectional view, showing the connection between the different parts of the machine; and Fig. 3, a section in plane of line $x\,x$, showing gearing connecting peat-mill with its distributing device.

A A represent the frame-work of the machine, consisting of upper and lower frames, B and C, connected together by vertical braces or rods D D, &c.

In the frame-work A A, and supported therein in any proper manner at E, is a horizontal receptacle, F, for the peat, to which it is conveyed, as will be presently described. Within the receptacle F a series of cutters or mashers, G G, &c., attached to a vertical shaft H, having bearings in upper frame-work, B, and lower plate of box F, are revolved by any proper operating power connected with said shaft H, thoroughly cutting and disintegrating the peat therein.

On upper end of vertical shaft H, and revolving with it, is a horizontal bevel-gear wheel, I, engaging and interlocking with a similar vertical gear, J, of a horizontal shaft, K, having bearings in end L of two parallel vertical frames, M, and N, hung by a circular projecting piece, O, upon the shaft H in such a manner as to freely swing thereon.

The frames M and N are divided into three parts or sections, P Q R, joined together at their contiguous ends by connecting-rods S S, hinged by a pivot, T, at one end to one part or section, and with a groove or slot, U, in the other end, through which passes, and into the frames, a screw-bolt, V, having on its outer end a nut, W, by the turning of which to the right or left on its bolt it is either brought to bear upon the rod S or released therefrom, as may be desired, thus allowing the rod to be moved back and forth upon the bolt, lengthening or shortening the distance between the contiguous sections or parts, and correspondingly the frame.

The frames M and N extend from the disintegrating-mill for the peat to the place where the peat is gathered or dug, and by its sections, connected together as described, is adjusted in length to conform to the distance between the mill and peat locality.

Between the inner portion of the frames, and extending entirely around the same, an endless band or belt, X, is placed, moving over and upon rollers at the extreme ends thereof, one of which is the shaft K, before referred to, and the other a transverse horizontal shaft, Y, having bearings at each end in a movable and adjustable frame, Z, to be hereinafter described. The endless band X is made in sectional plates joined together in a peculiar and novel manner (for which I reserve to myself the right to make separate application for Letters Patent should I deem it necessary) and extends across the width between the frame, M and N, and has a series of rollers, $a'$ $a'$, &c., hung upon the outer edges thereof, bearing and traveling upon suitable guiding-surfaces of the two frames, as seen at $b'$ and $c'$ in Fig. 2.

Upon the outer end of the endless band the peat, as fast as gathered, is placed, and then carried thereby, receiving motion through its shaft K and bevel-gear thereon, J, connected with the driving-shaft H, up and to the upper end thereof, where it falls into the disintegrating peat-mill to be operated upon.

The outer end of the frames M and N rests upon the ground through a wheel, $d'$, attached thereto, and by being hung upon the vertical shaft H, as described, can be revolved upon the same as a center at pleasure, thereby enabling its outer end to be carried or swung to any desired locality within the extent of its radius, which, together with its extensibility, as before described, enables the frame to be moved to any locality and adjusted in position, according as the same may be in an angular or straight direction from the mill, or any length or distance therefrom, the many advantages of which are evident.

In order to shorten or lengthen the endless band in order to cause it to conform to the length of its frame, its outer roller, upon which it turns, is hung on adjustable bearings of a frame, Z, moved in or out by screw-nuts $f'$ $f'$ on outer ends of screw-bolts $g'$ $g'$ of said frame Z.

On lower end of vertical shaft H, and turning with it, is a horizontal bevel-gear, $h'$, engaging with another bevel-gear, $i$, of a horizontal shaft, $j'$, turning in bearings of a frame, $k'$, hung and swinging upon the shaft H below the gear $h'$. On same shaft $j'$ with the gear $i'$, but at the other end, is another bevel-gear, $l'$, engaging with a gear-bevel, $m'$, of the horizontal shaft $n'$, having bearing at each end in a box or receptacle, $o'$, and around its periphery, between the ends of and within the said box, a spiral or screw-shaped thread or surface, $p'$. The box $o'$ is secured at its inner end to the frame $k'$, turning on the shaft H, as before described, and on its outer end has a wheel, $q'$, bearing and traveling upon the ground.

Connected with the inner end of the box $o'$, and to its upper portion, is a short tube, $r'$, passing upward therefrom and communicating with a circular slot or groove, $s'$, in bottom of disintegrating-mill, extending nearly half round the same, as seen in Fig. 1. On upper end of tube $r'$, and moving in a proper-shaped guiding-way under the groove $s'$, is a circular piece, $t'$, which keeps the said groove $s'$ closed at all points except at the opening of the tube $r'$.

Through the tube $r$ the disintegrated peat from the mill passes, entering the inner end of the box $o'$, where it is caused to be moved along to the outer end of the same by the revolution of the screw-shaft therein, receiving motion through the intermediate gearing, described as connecting it with the driving-shaft, and delivered out thereof through an aperture, $u'$, in its bottom plate to the ground, where it is allowed to remain until dried to a sufficient degree, first, however, being marked off into sections or blocks of the proper size by simply turning down at the proper times the marking device $v'$, attached to a swinging frame, $w'$, of the box $o'$, when it is broken into cakes according to its marks, and is ready for market or use.

The box $o'$, by being hung, as described, to the vertical shaft H as a center, can be swung around upon the same, and thus spread out the peat, as it passes through the delivery-opening of the box, upon the ground and in the desired locality, the gearing through which its screw-shaft is operated being so arranged that the moving of the box shall in no manner destroy or interfere with its connections, and the same may be also said of the gearing connecting the endless-band frame to the driving power or shaft.

From the above description it is apparent that in the manufacture of peat to be used as fuel there is no necessity for carting or conveying it from place to place, as has heretofore been necessary, in order to cut or disintegrate it and then dry it, but that the peat has simply to be thrown upon the adjustable endless feed-band, as described, at the place where it is gathered, by which it is then conveyed to the mill to be disintegrated, and after thus being thoroughly operated upon is delivered and spread upon the ground through the delivery-box described and marked into the proper divisions or cakes, after which it is broken up according to the same, and is ready for market or use.

The various parts composing the machine receive motion from the same driving-shaft, which may be operated either by horse or steam power, or in any proper manner.

The delivery-aperture in the distributing-box for the peat may extend the whole length of the box, and, being provided with a proper-arranged slide or cover, any portion of the same may be closed or opened at pleasure, thus delivering the peat at and upon any desired locality of the ground within its circuit or scope. The box also may be made in sections of any length, and so arranged as to be easily detached from each other, and so also with the spiral shaft, thus enabling them to be shortened or extended to any desired length, and producing a corresponding increase in its circuit for the spreading of the peat.

The endless-band frame may be also made in more than three sections or parts, as herein described, and represented in the drawings, and of any desired length and size, it being only necessary that they should be so arranged as to be easily adjusted with regard to each other, so as to increase or decrease the length of the frame, according to the distance of the peat locality from the peat-mill; and, also, the endless band can be so constructed that when the length of its frame is decreased or increased in any great degree it can be correspondingly shortened or lengthened at pleasure, but for any small degree the adjustable bearings for the band will answer.

Having thus described my invention, I claim as new and desire to secure by Letters Patent—

1. The within-described machine for the manufacture of peat, the same consisting of the endless feeding-band and its frame, and the box or receptacle for distributing and spreading the peat upon the ground to be dried, arranged together and connected with any proper mill for disintegrating the peat, substantially in the manner herein above described, and represented in the drawings.

2. The adjustable frame for the endless band, made in separate sections or parts and connected together, substantially as described, and for the purpose specified.

3. Connecting the endless band with and operating the same by the driving-shaft of the mill through gearing so arranged as to allow its outer end to be brought to any desired locality, substantially as and for the purposes specified.

4. The arrangement of the distributing or spreading box for the peat, the same consisting in so attaching it to the driving-power of the mill as to be freely turned or swung around upon the driving-shaft thereof without disconnecting the same therefrom, substantially as herein described.

5. The use of the spiral feeding-shaft for feeding the peat along in its spreader as fast as it enters the same through the tube thereof, connecting it with the disintegrating-mill, arranged and operating substantially as described.

6. The device described for marking the peat when spread upon the ground, arranged and connected with its distributer as set forth.

MARVIN S. ROBERTS.

Witnesses:
DELOS DUNTON,
THOS. ROOT.